United States Patent [19]

Hasegawa

[11] Patent Number: 4,737,626

[45] Date of Patent: Apr. 12, 1988

[54] PHOTOELECTRIC TOUCH PANEL HAVING REFLECTOR AND TRANSPARENT PHOTOCONDUCTIVE PLATE

[75] Inventor: Kazuo Hasegawa, Furukawa, Japan

[73] Assignee: Alps Electric Co., Ltd., Japan

[21] Appl. No.: 830,555

[22] Filed: Feb. 18, 1986

[30] Foreign Application Priority Data

Feb. 15, 1985 [JP] Japan .................. 60-20129[U]

[51] Int. Cl.⁴ .................. G01V 9/04; H04L 00/00
[52] U.S. Cl. .................. 250/221; 250/227; 340/365 P
[58] Field of Search .................. 250/221, 222.1, 227; 340/555, 556, 557, 365 P

[56] References Cited

U.S. PATENT DOCUMENTS 3,584,226 6/1971 Lerner .................. 250/222.1
3,764,813 10/1973 Clement et al. .................. 250/221
3,775,560 11/1973 Ebelling et al. .................. 250/352
3,860,754 1/1975 Johnson et al. .................. 340/365 P
4,517,559 5/1985 Deitch et al. .................. 250/221
4,563,577 1/1986 Schaller .................. 250/221

Primary Examiner—David C. Nelms
Assistant Examiner—Stephone B. Allen
Attorney, Agent, or Firm—Guy W. Shoup

[57] ABSTRACT

A photoelectric touch panel characterized in that one side is provided with a substrate having light emitting elements and light sensing elements mounted thereon and an opposing side of the touch panel has a multi-directional reflecting surface for collecting dispersed portions of the light emitted by the light emitting elements. The multi-directional reflecting surface is joined with a photo-conductive body which guides the collected light back to the light sensing elements at the first side of the touch panel.

4 Claims, 3 Drawing Sheets

PHOTOELECTRIC TOUCH PANEL HAVING REFLECTOR AND TRANSPARENT PHOTOCONDUCTIVE PLATE

FIELD OF THE INVENTION

The present invention relates to a photoelectric coordinate touch panel in which a light beam lattice is interrupted at one point and the panel sends data to a computer in accordance with the interruption coordinates. The touch panel can be mounted to a display device such as a CRT.

BACKGROUND OF THE INVENTION

Shown in FIG. 2 is a conventional photoelectric coordinate sensing panel of this type. Namely, in FIG. 2, printed circuit boards 1a and 1b are light emitting element substrates and boards 2a and 2b are light sensing element substrates. The light emitting element substrates 1a, 1b and light sensing element substrates 2a, 2b are respectively arranged across from each other on the X and Y axes to form a rectangular frame.

The light emitting element substrates 1a, 1b are provided with a plurality of light emitting elements (LEDs) 3 in a line or in a curve fitting to the curvilinear surface of a display in view of alleviating parallax, while the light sensing element substrates 2a, 2b are provided with a plurality of opposing light sensing elements 4 also in a line or in a curve fitting to the curvilinear surface of a display. A switching circuit 5 is also provided on the boards.

In this photoelectric panel the light from LEDs 3 transversely crosses near the surface of display forming a lattice of infrared beams 6 and unique addresses are assigned to each photoelectric element along an axis (X or Y). By sequentially accessing each photoelectric detector, it can be determined which LED 3 emits the light and which light sensing element 4 senses the light by switching the control lines connected to the LEDs 3. When a displayed image on the display screen is touched with a finger or a touch pen, the infrared beams 6 are interrupted, the X-Y coordinates of the interrupted infrared beams 6 are sent to a computer. When a wide object (finger) also blocks the infrared beams 6 of a plurality of rows and columns adjacent to the center position, the intended center point can be obtained by averaging the data. Various measures are taken for invalid interruptions using logic circuits and disturbance of the light beam are compensated by a compensating circuit.

However, in such a photoelectric touch panel, where a circuit needs to be formed on each substrate and assembled into the form of a frame, the wiring becomes complicated, making assembly troublesome and preventing reduction in size.

Recently, as shown in FIG. 3, there was developed a touch panel in which the light emitting elements (LEDs) 8 and light sensing elements (photo-transistors) 9 are provided in parallel along sides of a shielding plate 10 on the same substrate 7a (7b) in the periphery of the display 13, and a reflector 11 such as a mirror is provided to the substrates 7c, 7d opposing the substrates 7a, 7b and the light beams 12 are formed like a lattice through reflection of light emitted from the LEDs 8.

However, in the photoelectric touch panel of this type, the distance which a light beam travels until it reaches the phototransistor 9 is doubled and thus a greater portion of the light is dispersed or scattered before reaching the photo transistor 9.

SUMMARY OF THE INVENTION

It is an object of the present invention to provide a photoelectric touch panel which elminates disadvantages of the prior art, facilitates the assembling procedures by simplifying the circuit arrangement and realizes reduction in size while assuring that the dispersed light beam is effectively collected and returned to the sensing elements.

In order to attain this object, according to the present invention a photoelectric touch panel is provided on one side with a substrate having light emitting elements and light sensing elements mounted thereon and at an opposing side with a multipath reflecting surface for collecting dispersed portions along with the axial portion of the light beams from the light emitting elements and directing them back to the light sensing elements via a photo-conductive light guide.

DETAILED DESCRIPTION OF THE INVENTION

A preferred embodiment of the present invention is explained with reference to accompanying drawings.

Figure 1:
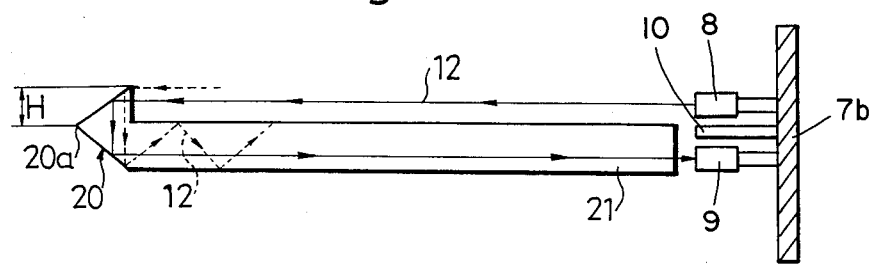
FIG. 1 is a top view indicating an example of the embodiment of the present invention.
Figure 2:
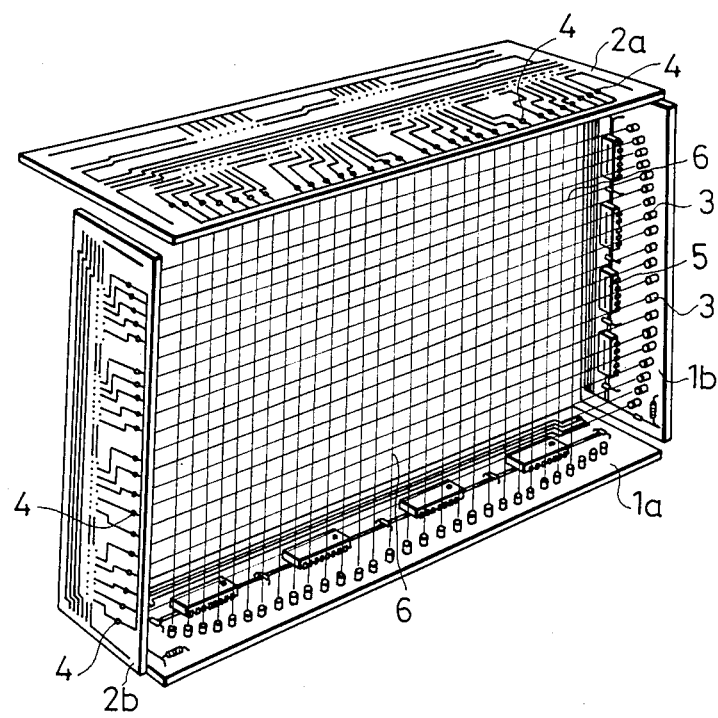
FIG. 2 is a perspective view indicating a prior art panel.
Figure 3:
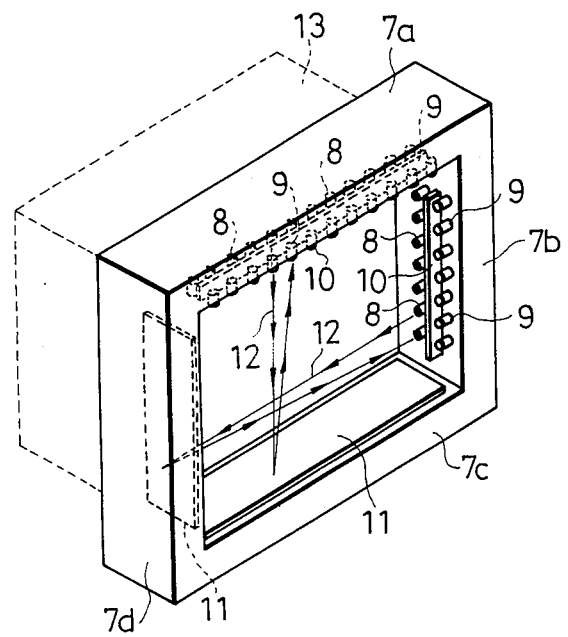
FIG. 3 is a perspective view showing the reflected light path of the recently developed touch panel.
Figure 4:
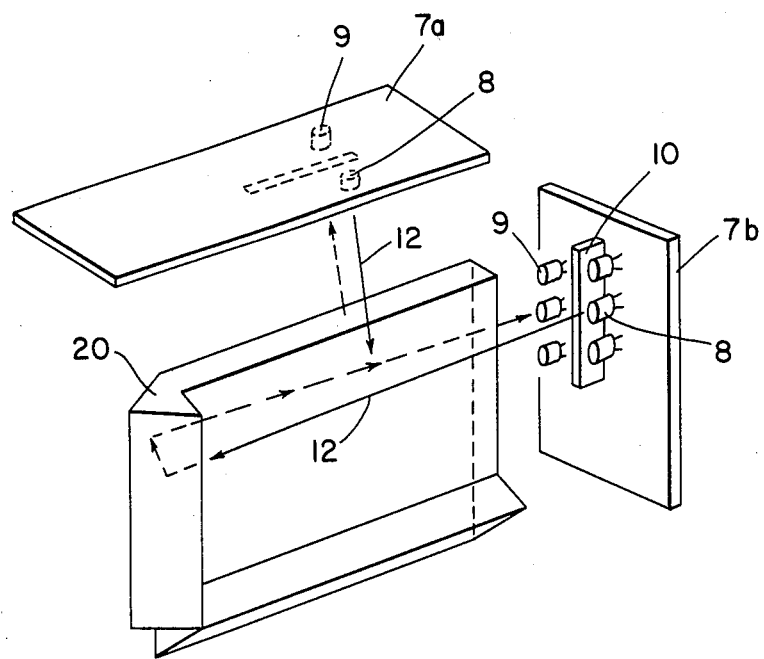
FIG. 4 is a perspective view showing assembly of the embodiment of FIG. 1.

In FIGS. 1 and 4, 20 is a multi-path reflector which collects light beams 12 emitted from the LEDs 8 of substrate 7b and this multi-directional reflector 20 is formed as a right triangle prism 20a extending along one side of the touch panel and having a light collection window through which the beam 12 enters, a light reflecting portion for collecting the dispersed beam 12 and directing it back to the phototransistor 9, and a light guide 21 formed as a transparent plate mounted onto the face of the touch panel where the light guide 21 is an acrylic photo conductive body integrated to the multi-direction reflector 20 and this photo conductive body 21 is used as the return path for the collected light beams 12 emitted from the LEDs 8 and reflected by said multi-directional reflector 20. Moreover, this photoconductive body 21 is formed with a thickness almost half the width of the prism portion 20a of the multi-directional reflector 20. Therefore, the light beams 12 travelling in the width H above the front surface of the photoconductive body 21 are all collected and reflected by the multi-directional reflector back to the sensors 9. In some cases, the light is reflected in a zig-zag path in the photoconductive body 21 and finally received by a photo transistor 9 at the distal end of the light guide 21.

In this embodiment, the multi-direction reflector 20 is formed like a right triangle prism but it is not limited only to such a form. For example, any form such as curvilinear surface, which effectively receives the light beams 12 and reflects them back to the phototransistor in concentrated form (i.e., parabolic reflectors) can be employed.

As described above, according to the present invention, the emitted light can be collected effectively, the amount of light received by the light sensing element can be increased and the overall circuit constitution can be simplified such that its manufacture can also be simplified and the device can be reduced in size.

What is claimed is:

1. A photoelectric touch panel comprising:
a rectangular frame defining a planar area for a matrix of light beams which is disposed in front of an associated display screen;
a row of light emitting elements in parallel with a row of light detecting elements, both rows being aligned in parallel with said matrix plane and disposed on at least one side of said frame, and each of the light emitting elements being associated with a corresponding one of the light detecting elements; and
light guide means for reflecting and returning light emitted by each of said light emitting elements across said matrix plane to the corresponding ones of said light detecting elements if the respective light beams therefrom are not interrupted by an object interposed in said matrix plane, wherein said light guide means is composed of reflecting means disposed on an opposing side of said frame opposite from said at least one side of said frame for receiving light beams emitted by said light emitting elements across said matrix plane and reflecting them back toward said light detecting elements along a planar photoconductive path, and a transparent photoconductive plate arranged to provide said planar photoconductive path for returning said reflected light beams to said light detecting elements, wherein said transparent photoconductive plate receives said reflected light beams on one side thereof, has an end surface on an opposite side thereof disposed adjacent said row of light detecting elements, and is disposed in parallel with said matrix plane in front of the display screen.

2. A photoelectric touch panel according to claim 1 wherein the light guide means is an acrylic plate.

3. A photoelectric touch panel according to claim 2 wherein the reflecting means is a right angle prism.

4. A photoelectric touch panel according to claim 3 wherein the prism is formed as an integral part of the acrylic plate.

* * * * *